March 13, 1973 TOHRU TAKEDA 3,720,811
ELECTROMAGNETIC COUNTERS

Filed Aug. 12, 1970 2 Sheets-Sheet 1

INVENTOR

TOHRU TAKEDA

By Chittick, Pfund, Birch,
Samuels & Gauthier  ATTORNEY

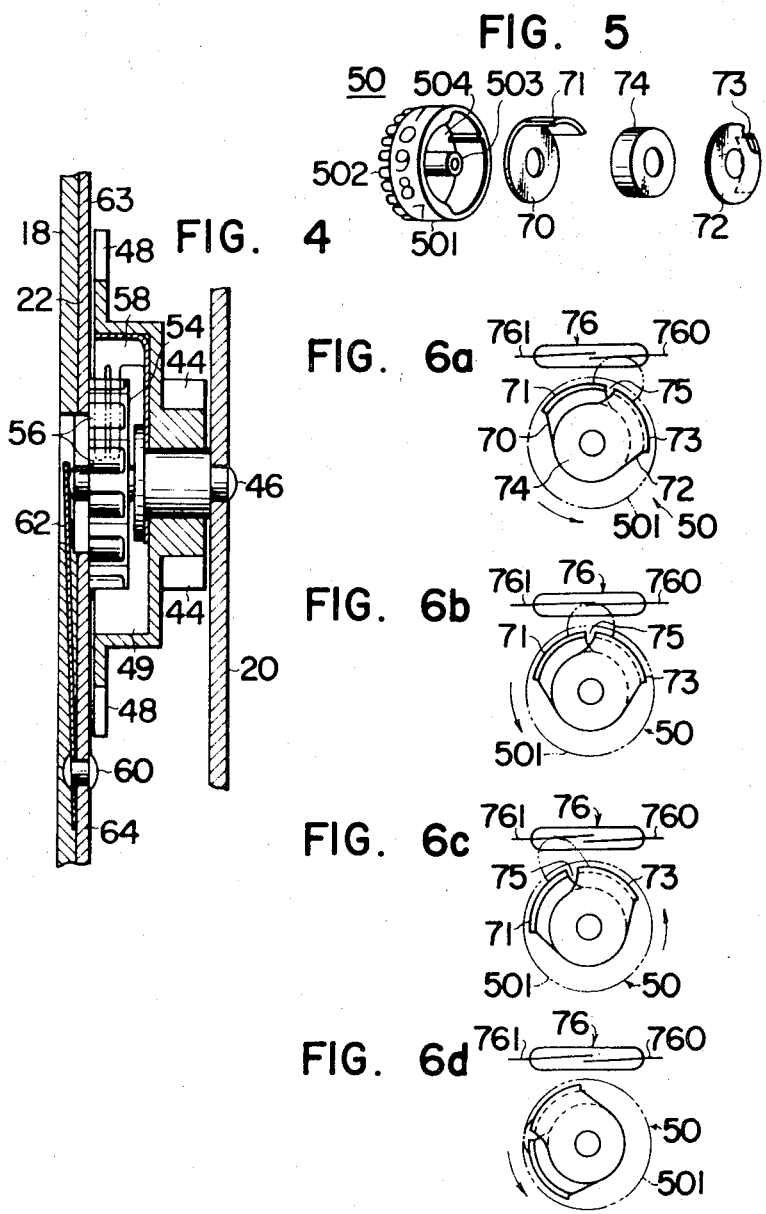

United States Patent Office 3,720,811
Patented Mar. 13, 1973

3,720,811
ELECTROMAGNETIC COUNTERS
Tohru Takeda, Tokyo, Japan, assignor to Tamura
Electric Works Limited, Tokyo, Japan
Filed Aug. 12, 1970, Ser. No. 63,067
Claims priority, application Japan, Aug. 13, 1969,
44/63,747
Int. Cl. G06n 1/02
U.S. Cl. 235—92 C                                    3 Claims

ABSTRACT OF THE DISCLOSURE

In an electromagnetic counter comprising an electromagnet connected to a source of input pulses, an intermittent advance mechanism driven by the electromagnet, a stepping mechanism including electrical read out means and driven by the intermittent advance mechanism, and a digit wheel stepping with the stepping mechanism to visually display the number of input pulses applied to the electromagnet, there are provided a reed switch disposed closely adjacent the digit wheel and a permanent magnet in the digit wheel to operate the reed switch by the rotation of the digit wheel to provide an output pulse. Where a pair of unit electromagnetic counters are juxtaposed in a pair the electromagnet of each unit is partially disposed in the casing of each unit and partially protrudes from the casing and the two units are combined such that the protruding portion of the electromagnet of one unit is received in the casing of the other.

BACKGROUND OF THE INVENTION

This invention relates to an improved electromagnetic counter and more particularly to an electromagnetic counter including means to count the number of input pulses to provide a visual display of the counted number, printing means to print said number of input pulses and electrical read out means. This invention further relates to an electromagnetic counter including means responsive to a predetermined number of consecutive input pulses to generate an output pulse such as a transfer signal or a reset signal.

A prior electromagnetic counter including means for providing an electrical read out of the type preferred to above is constructed either to provide a visual display or printing of the number of received input pulses. Recently, however, with the development of remote control technique it is highly desirable to provide a compact electromagnetic counter capable of providing both visual displays and printed records.

Further, it is also desirable to design extremely thin such electromagnet counter, because a number of unit electromagnetic counters are piled up one upon the other so as to utilize the transfer pulse of one unit as the input pulse for the next unit. However, owing to the dimensions of the electromagnet, especially of its coil, it has been impossible to decrease the thickness or width of the unit beyond a certain limit. Further it is also necessary to provide an electric signal in response to the rotation of the digit wheel. In prior electromagnetic counters two types of sliding contacts have been used, one including a wiper scanning a printed circuit for reading out digits and the other a wiper for sliding on a transfer or resetting printed circuit. Generally however, as the current carrying capacity of the sliding contact is limited it is necessary to amplify the output signal of the counter where the output signal of one unit of a plurality of stacked units is utilized as the input pulse for the next succeeding unit.

SUMMARY OF THE INVENTION

It is an object of this invention to provide a novel electromagnetic counter capable of providing both a visual indication and printed record of the number of input pulses.

Another object of this invention is provide an improved unit electromagnetic counter of small thickness so that a plurality of units can be stacked one upon the other into a compact assembly.

Further object of this invention is to provide a novel electromagnetic counter capable of providing a large output thus eliminating the use of an amplifier.

Still further object of this invention is to provide an improved contact mechanism for printed conductors associated with a printing wheel for electrical read out.

In accordance with this invention there is provided an electromagnetic counter comprising an electromagnet connected to a source of input pulses, an intermittent advance mechanism driven by the electromagnet, a stepping mechanism driven by the intermittent advance mechanism, said stepping mechanism including electrical read out means, and a digit wheel stepping with the stepping mechanism to visually display the number of input pulses aplied to the electromagnet characterized by a reed switch disposed closely adjacent the digit wheel and a permanent magnet contained in the digit wheel to operate the reed switch by the rotation of the digit wheel to provide an output signal. The permanent magnet includes a pair of pole pieces sandwiching the same. The pole pieces have bent portions extending toward each other and disposed on the same circle with a relatively small air gap therebetween. The reed switch is positioned close to the electromagnet so that the flux produced by the permanent magnet flows through the contacts of the reed switch around the air gap to operate the switch.

According to further aspect of this invention, where a plurality of unit electromagnetic counters are stacked upon each other, the electromagnet of each unit is partially contained in each casing and partially protrudes from the casing and adjacent units are combined such that the protruding portion of one unit is received in the casing of the other unit.

There are also provided a printing gear concurrently stepped with the digit wheel by the electromagnet through a stepping mechanism and a contact mechanism successively scanning a plurality of printed conductors associated with the digit wheel or printing wheel.

BRIEF DESCRIPTION OF THE DRAWINGS

In the accompanying drawings:
FIG. 4 is a fragmentary sectional view of an electric read out device of the counter of this invention taken on line IV—IV of FIG. 2;
FIG. 5 is an exploded view to show the construction of a display digit wheel utilized in this invention and
FIGS. 6a to 6b are partial views to explain the operation of a reed switch associated with the digit wheel.

DESCRIPTION OF THE PREFERRED EMBODIMENTS

Figure 1:
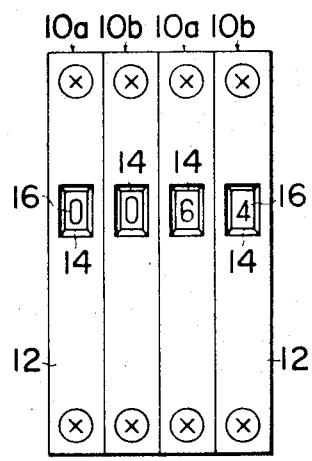
FIG. 1 is a front elevation view of an assembly including a plurality juxtaposed unit electromagnetic counters of this invention for displaying digits of multiple units.

Referring now to FIG. 1 there are shown four similar unit electromagnetic counters 10 which are stacked in side-by-side relationship. Two adjacent unit counters designated by reference numerals 10a and 10b comprise a pair corresponding to two units of numbers. Each front panel 12 is provided with a window 14 through which digits 16 on the periphery of a display digit wheel 50 (to be described later in detail) can be read.

Figures 3A, 3B:
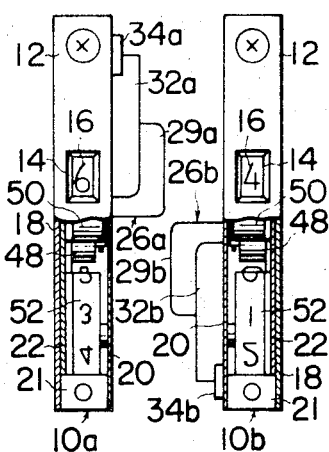
FIG. 3a shows a front view of the unit counter shown in FIG. 2.
FIG. 3b shows a front view of the other unit of the pair shown in FIG. 1.

The construction of a unit electromagnetic counter 10a will now be described with reference to FIGS. 2 and 3a. Counter 10a comprises a casing defined by two side plates 18 and 20, a printed substrate 22 bonded to side plate 18 and an electromagnet 26a having a U-shaped magnetic core 28 with one leg secured to side plate 18 and substrate 22 and the other leg wound with a coil 30a, said electromagnet occupying the upper half of the space 24 in the casing. As shown in FIG. 3a about one-half of the thickness of the electromagnet protrudes outwardly from side plate 20. The coil 30a is wound on a bobbin 29a and side plates 18 and 20 are held spaced apart by spacers 21 and 23.

One end of armature 32a attracted by core 28 when coil 30a is energized is resiliently supported by one end of the core by means of a spring clip 34a and the other end of armature 32a is pivotally connected to an escapement 38 by means of a pin 36. The escapement is arranged to be rotated about a pin 40 secured to the side plate 18 by armature 32a and is normally biased in the clockwise direction by a tension spring 42. A ratchet wheel 44 is provided to alternately engage a pair of pawls 38a and 38b of the escapement to intermittently rotate about a shaft 46 when armature 32a is energized and deenergized. Each step of the ratchet wheel corresponds to 1/20 of its complete revolution. A gear 48 mounted on the same shaft 46 as ratchet 44 meshes digit wheel 50 and printing wheel 52.

The other electromagnetic counter 10b has a construction similar to that of counter 10a except that electromagnet 26b and armature 32b protrudes in the opposite direction with respect to electromagnet 26b and armature 32a as shown in FIG. 3b. More particularly, one leg of its U-shaped core is secured to the lower edge of the space 24 so that its coil occupies the lower half of the space. In FIG. 3b, reference numeral 29a indicates a coil bobbin and 32b shows an armature clamp.

When unit electromagnetic counters 10a and 10b are assembled together portions of one unit counter 10a extending to the right of its righthand side plate 20 are accommodated in the upper half of the space of the other unit 10b. In the same manner portions of the unit counter 10b extending to the left of its lefthand side plate 20 are accommodated in lower half of the space of other counter 10a. In this manner, two conjugate unit electromagnetic counters are assembled in a pair.

As shown in FIG. 4, the gear 48 rotated with ratchet 44 is formed with a cup shaped member 49 to receive a circular distributing board 54 secured to printed substrate 22. On the periphery of the circular distributing board 54 are secured ten distributing pins 56 respectively connected to corresponding printed conductors 63 on the substrate for decimal read out, said printed conductors extending to the circuit board at the righthand end as viewed in FIG. 2 to display 1, 2 . . . 0, respectively. A resilient contact member 58 is secured to the inner side of cup shaped member 40 to radially extend towards shaft 46.

Since the inner end of contact member 58 resiliently engages either one of the distributing pins 56 and since lefthand end of shaft 46 is engaged by the free end of a leaf spring 62 electrically connected to printed conductor 64 the contact member 58 is connected to conductor 64 through shaft 46, leaf spring 62, and rivet 60. Conductor 64 extends to the righthand end of the circuit board as a common conductor.

Display digit gear 50 meshing with gear 48 is mounted on a shaft 66 journalled in side plate 18. Mounted around the periphery of the digit wheel are ten digits from 1 to 0 which can be viewed through window 14 in front panel 12. It is to be understood that contact member 58 engages a particular one of distributing pins 56 corresponding to a particular digit to be read through window 14. Printing wheel 52 meshing with gear 48 and mounted on shaft 68 is provided with ten printing types representing digits 1 to 0 on its periphery. The particular digit of a type 53 at the printing position corresponds to the particular digit on the digit wheel and the particular distributing pin 56 which are read out visually and electrically.

FIG. 5 shows one example of the construction of the digit wheel 50. As shown in FIG. 5, the main body 501 of the digit wheel 50 is provided with ten digits 1 to 0 inclusive on its outer periphery and a plurality of axial pins 502 meshing with gear 48. In the recess 504 inside the main body 501 are received a pair of pole pieces 70 and 72 mounted on the boss 503 and a permanent magnet 74 positioned between pole pieces 70 and 72 and is magnetized in the axial direction. Pole pieces 70 and 72 are provided with bent portions 71 and 73 extending in the axial direction along the inner surface of the main body 501. As shown in FIG. 6 bent portions 71 and 73 are spaced apart by a small gap 75 in the circumferential direction and project toward each other.

Figure 2:
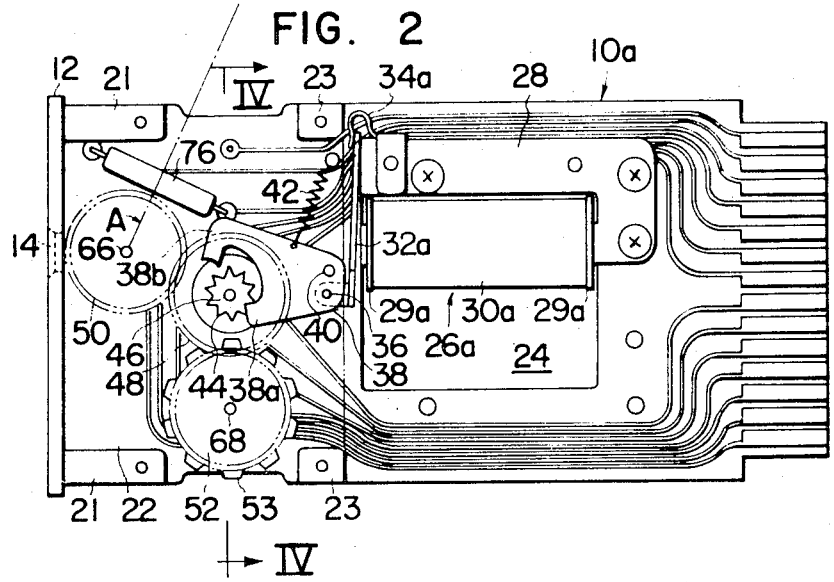
FIG. 2 is a side elevation view of one of a pair of unit electromagnetic counters shown in FIG. 1.

As shown in FIGS. 2 and 6 a reed switch 76 is disposed close to the periphery of the display digit wheel 50. Opposite terminals of the reed switch are connected to printed conductors respectively, one of them being common with one terminal of the coil and designated as "coil, transfer and reset." The reed switch 76 is contained in the same plane as the digit wheel and is disposed in parallel with a tangent passing through a point A on the periphery of the digit wheel. The contacts of the reed switch are positioned on a radius or normal passing through point A.

The operational relationship between the digit wheel 50 and reed switch 76 will now be described with reference to FIGS. 6a to 6d. As shown in FIG. 6a where the gap 75 between bent portions 71 and 73 of the pole pieces 70 and 71 contained in the main body 501 of the digit wheel 50 is on the side of the righthand contact piece 760 of the reed switch, the magnetic flux produced by the permanent magnet 74 will pass from bent portion 73 of one pole piece 72 to bent portion 71 of the other pole piece 70 via contact piece 760.

Accordingly, the reed switch 76 will not be closed. When the digit wheel is rotated to bring the gap 75 to oppose the contacts between two contact pieces 760 and 761, the magnetic flux will pass from bent portion 73 to the other bent portion 71 via both contact pieces 760 and 761, thus closing the reed switch 76 as shown in FIG. 6b. As the digit wheel is further advanced to bring gap 75 to oppose contact piece 761 as shown in FIG. 6c, the flux will flow only through contact piece 761 thus opening the reed switch 76. Thus according to this invention since the magnetic structure constructed as above described is contained in the digit wheel it is possible to close and open the reed switch with an extremely small angle of rotation of the digit wheel. For example rotation of less than 23° is sufficient to operate a reed switch of 18 mm. outer diameter. This means that each step of rotation of 36° is sufficient for a digit wheel operating on the decimal basis. It is to be understood that this invention is also applicable to other type of digit wheels operating on the non-decimal basis.

While the invention has been shown and described in terms of a preferred embodiment it should be understood that the invention is not limited in any way to this particular embodiment and that many changes and modifications will occur to one skilled in the art without departing from the true spirit and scope of the invention as defined in the appended claims.

What is claimed is:

1. In an electromagnetic counter adapted to respond to a source of input pulses, having a digit wheel to display the number of input pulses applied and a reed switch disposed closely adjacent said digit wheel and a permanent magnet provided for said digit wheel to operate said reed switch by the rotation of said digit wheel to produce an output pulse, the improvement comprising: said permanent magnet being contained within said digit wheel and being magnetized in a direction approximately parallel to the axis of said wheel, and a pair of pole pieces located on opposite sides of said magnet and extending in planes perpendicular to the axis of said wheel, said pole pieces having bent portions extending toward each other and disposed on a circle approximately concentric with the periphery of said wheel, said bent portions having a relatively small air gap between them along said circle, and said reed switch being adapted to be activated by magnetic flux within said air gap.

2. The electromagnetic counter according to claim 1 wherein said reed switch has a pair of cooperating contacts and is disposed such that said contacts lie substantially parallel to a tangent to said digit wheel and on a normal to said tangent.

3. An electromagnetic display counter comprising:
a cup-shaped member;
an electrically conductive shaft on which said cup-shaped member is rotatably mounted;
means for selectively and incrementally rotating said cup-shaped member about said shaft in response to input pulses;
a plurality of electrically conductive pins arranged substantially in a circle and extending into said cup-shaped member;
a resilient electrically conductive contact member secured to the inner side of said cup-shaped member, contacting said shaft and adapted to sequentially engage said pins as said cup-shaped member is rotated;
multiple conductors respectively connected to said pins;
a common conductor connected to said shaft; and
electrically operated display means connected to said multiple and common conductors to indicate which of said pins is engaged, a closed electrical circuit to said display means being formed by each engaged pin, said contact member, said shaft, said common conductor and the one of said multiple conductors connected to said engaged pin.

References Cited
UNITED STATES PATENTS

| | | | |
|---|---|---|---|
| 3,278,725 | 10/1966 | Gunst | 235—92 C |
| 3,429,258 | 2/1969 | Baranoff | 235—92 EA |
| 3,529,768 | 9/1970 | Nakanishi | 235—132 E |
| 3,289,131 | 11/1966 | Watkins | 235—92 A |
| 2,827,626 | 3/1958 | De Motte | 235—92 EA |

MAYNARD R. WILBUR, Primary Examiner

R. F. GNUSE, Assistant Examiner

U.S. Cl. X.R.

235—92 R, 92 EA; 340—379